(12) United States Patent
Habara et al.

(10) Patent No.: US 12,619,642 B1
(45) Date of Patent: May 5, 2026

(54) ADAPTIVE API INTEGRATION FRAMEWORK WITH AUTOMATED SCENARIO SIMULATION AND SELF-HEALING MECHANISM

(71) Applicant: HITACHI, Ltd., Tokyo (JP)

(72) Inventors: Takuya Habara, Santa Clara, CA (US); Naohiro Kohmu, Santa Clara, CA (US); Sudhanshu Gaur, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 19/191,328

(22) Filed: Apr. 28, 2025

(51) Int. Cl.
  *G06F 16/334* (2025.01)
  *G06F 11/3668* (2025.01)
  *G06F 16/338* (2019.01)

(52) U.S. Cl.
  CPC ........ *G06F 16/334* (2019.01); *G06F 11/3688* (2013.01); *G06F 16/338* (2019.01)

(58) Field of Classification Search
  None
  See application file for complete search history.

(56) References Cited

U.S. PATENT DOCUMENTS

| | | | |
|---|---|---|---|
| 11,917,013 B1 | 2/2024 | Han | |
| 2009/0158238 A1* | 6/2009 | Jung | G06F 9/44 |
| | | | 717/100 |
| 2017/0124211 A1* | 5/2017 | Suter | H04L 67/02 |
| 2019/0325074 A1* | 10/2019 | Ghezzi | G06F 9/547 |
| 2022/0318081 A1* | 10/2022 | Jindal | G06F 9/541 |
| 2022/0350652 A1 | 11/2022 | Fujita et al. | |

* cited by examiner

*Primary Examiner* — Yu Zhao
(74) *Attorney, Agent, or Firm* — Procopio, Cory, Hargreaves & Savitch LLP

(57) ABSTRACT

Systems and methods described herein involve application programming interface (API) management of information retrieval, which can include generating descriptions for each API on an API list, the generating the descriptions involving executing queries on the API list based on API documentation or API specifications; executing natural language processing to extract input examples and corresponding meanings, and output examples and corresponding meanings for the each API in the API list; and generating the descriptions for the each API on the API list from the input examples and corresponding meanings and the output examples and corresponding meanings. Generating an API execution scenario can involve providing the generated descriptions and user query history to a machine learning algorithm configured to extract similar APIs to the user query history to generate the API execution scenario comprising the extracted similar APIs. Such API execution scenarios are then subsequently executed in response to user queries.

16 Claims, 7 Drawing Sheets

ADAPTIVE API INTEGRATION FRAMEWORK WITH AUTOMATED SCENARIO SIMULATION AND SELF-HEALING MECHANISM

BACKGROUND

Field

The present disclosure is generally directed to Application Programming Interfaces (APIs), and more specifically, to adaptive API integration frameworks.

Related Art

Many companies are engaging in digital transformation. Digital transformation is an initiative that aims to improve operational efficiency and create added value by leveraging digital technologies. The core of digital transformation lies in integrating various systems and the data sharing. In addition to data from relational databases (RDB), time-series databases and object storage, there is also data obtained via APIs. By combining various sources of data, it becomes possible to utilize data across different business areas.

For example, in the railway industry, different business systems are used depending on the type of operation. In vehicle manufacturing, Enterprise Resource Planning (ERP) systems, Product Lifecycle Management (PLM) systems, and Manufacturing Execution Systems (MES) are employed. For railway operations, automatic train control systems and train operation management systems are used, while maintenance operations rely on rolling stock condition monitoring systems and infrastructure condition monitoring systems. Data from these systems can be obtained from databases such as Relational Databases (RDBs), files such as Comma-Separated Values (CSVs) and Extended Markup Language (XMLs), or through APIs uniquely defined by each business system. Although the railway industry is used as an example, various business systems and APIs exist across multiple operations in other industries as well. This invention focuses on data acquisition through APIs.

Users aim to leverage the data from these systems to improve their operations. A data utilization platform is required to provide consistent data handling and system integration with these systems. Generally, each system has numerous APIs, and different data can be retrieved by specifying different endpoints and execution parameters. Since the endpoints and parameters are diverse, users often struggle to determine how to execute the APIs to obtain the desired data. They must carefully read manuals and go through trial and error to acquire the required data, which presents a significant challenge.

Furthermore, in some cases, the desired data cannot be obtained through a single API execution but requires a combination of multiple API executions. An example of this is data integration in maintenance operations. For instance, if a user wants to track changes in the condition of a railway vehicle since the last maintenance, they must extract relevant API execution candidates related to maintenance data, railway vehicle operation data, and vehicle condition data and then determine the sequence in which these APIs should be executed.

In the related art, there are systems and methods for determining the execution order of multiple APIs. Such systems and methods allow users to select multiple APIs and specify a call order relation between them based on API specifications or usage history. It then determines the execution order of the APIs, considering factors such as parallel execution, error rates, and latency, to improve efficiency and reduce execution costs.

In another related art implementation, there are systems and methods for integrating and managing API executions in a gateway device. Such related art systems and methods facilitate a client device to set execution types for multiple APIs, registering them as an API service. It supports executing APIs in parallel or in series without requiring direct API calls from the client. By managing API execution through a gateway, it minimizes traffic and optimizes service execution.

SUMMARY

In the above related art implementations for executing multiple APIs, such implementations determine the call order based on API specifications or predefined scenarios, enabling efficient data utilization. However, the selection of APIs and the creation of scenarios are static processes that require manual intervention by the user. In example implementations described herein, by utilizing LLMs to generate API execution scenarios, it becomes possible to enable automated and dynamic API execution, addressing the limitations of conventional methods.

Example implementations described herein can facilitate automated API integration and scenario generation. Instead of manually reading through API manuals and experimenting with various endpoints and parameters, the system in example implementations described herein leverages natural language processing and machine learning algorithms to dynamically generate API descriptions and execution scenarios. This automation not only saves time but also reduces errors in the API selection process.

Example implementations described herein can facilitate enhanced efficiency and reduced costs. By analyzing historical user queries, execution logs, and performance data, the system in example implementations described herein determines the optimal sequence for API calls—considering factors such as error rates, execution times, and dependencies between APIs. This results in more efficient data retrieval and minimizes unnecessary API calls, leading to reduced execution costs.

Example implementations described herein can facilitate dynamic adaptability. The example implementations described herein continuously updates the API descriptions and execution scenarios in response to any changes in API documentation or user query history. This dynamic adaptation ensures that the system remains effective even as the underlying APIs evolve, providing a robust solution for environments where APIs are frequently added or modified.

Example implementations described herein can further facilitate self-correction and reliability. The inclusion of a scenario self-correction unit enables the system to monitor API execution in real time. When an anomaly or error is detected, the system of the example implementations can identify the problematic API and dynamically generate an alternative execution scenario. This self-correction capability ensures continued data retrieval and system reliability, even in the face of unexpected issues.

Aspects of the present disclosure can involve a method for application programming interface (API) management of information retrieval, which can include generating descriptions for each API on an API list, the generating the descriptions involving executing queries on the API list based on API documentation or API specifications; executing natural language processing to extract input examples and corresponding meanings, and output examples and corresponding meanings for the each API in the API list; and generating the descriptions for the each API on the API list from the input examples and corresponding meanings and the output examples and corresponding meanings; generating an API execution scenario that defines ones of the APIs in the API list to execute, the generating the API execution scenario involving providing the generated descriptions and user query history to a machine learning algorithm configured to extract similar APIs to the user query history to generate the API execution scenario comprising the extracted similar APIs; and executing the generated API execution scenario in response to user queries facilitated by user query handling.

Aspects of the present disclosure can involve a system for application programming interface (API) management of information retrieval, which can include means for generating descriptions for each API on an API list, the means for generating the descriptions involving means for executing queries on the API list based on API documentation or API specifications; means for executing natural language processing to extract input examples and corresponding meanings, and output examples and corresponding meanings for the each API in the API list; and means for generating the descriptions for the each API on the API list from the input examples and corresponding meanings and the output examples and corresponding meanings; means for generating an API execution scenario that defines ones of the APIs in the API list to execute, the means for generating the API execution scenario involving means for providing the generated descriptions and user query history to a machine learning algorithm configured to extract similar APIs to the user query history to generate the API execution scenario comprising the extracted similar APIs; and means for executing the generated API execution scenario in response to user queries facilitated by user query handling.

Aspects of the present disclosure can involve a computer program, storing instructions for application programming interface (API) management of information retrieval, the instructions which can include generating descriptions for each API on an API list, the generating the descriptions involving executing queries on the API list based on API documentation or API specifications; executing natural language processing to extract input examples and corresponding meanings, and output examples and corresponding meanings for the each API in the API list; and generating the descriptions for the each API on the API list from the input examples and corresponding meanings and the output examples and corresponding meanings; generating an API execution scenario that defines ones of the APIs in the API list to execute, the generating the API execution scenario involving providing the generated descriptions and user query history to a machine learning algorithm configured to extract similar APIs to the user query history to generate the API execution scenario comprising the extracted similar APIs; and executing the generated API execution scenario in response to user queries facilitated by user query handling. The computer program and instructions can be stored in a non-transitory computer readable medium and executed by one or more processors.

Aspects of the present disclosure can involve a data utilization platform system for application programming interface (API) management of information retrieval, which can include a processor, configured to generate descriptions for each API on an API list, by executing queries on the API list based on API documentation or API specifications;

executing natural language processing to extract input examples and corresponding meanings, and output examples and corresponding meanings for the each API in the API list; and generating the descriptions for the each API on the API list from the input examples and corresponding meanings and the output examples and corresponding meanings; generate an API execution scenario that defines ones of the APIs in the API list to execute, by providing the generated descriptions and user query history to a machine learning algorithm configured to extract similar APIs to the user query history to generate the API execution scenario comprising the extracted similar APIs; and execute the generated API execution scenario in response to user queries facilitated by user query handling.

DETAILED DESCRIPTION OF THE INVENTION

Figure 1A:
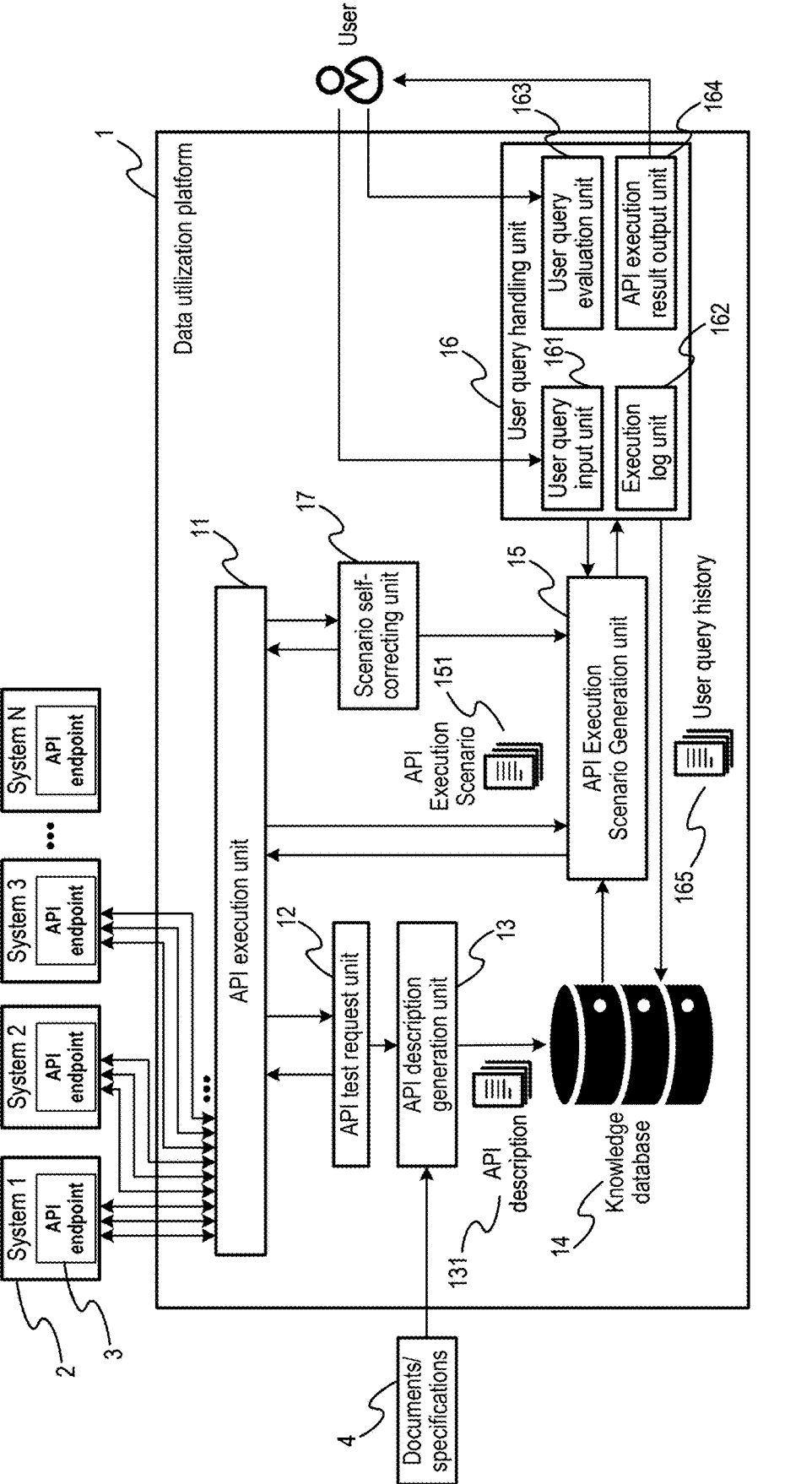
FIG. 1(a) is an illustration of the data utilization platform, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1(a) illustrates the data utilization platform (1), in accordance with an example implementation. The API management system facilitates efficient execution and integration of APIs. In this example, there are various systems (2) that utilize their own corresponding API endpoints (3). The system can include the following elements.

API Execution Unit (11) executes APIs based on test requests and generated scenarios. API Test Request Unit

(12) generates API execution requests for API description generation. API Description Generation Unit (13) generates API descriptions from API test results and documentation or specifications (4). Knowledge Database (14) stores API descriptions and the query history. API Execution Scenario Generation Unit (15) analyzes API descriptions and query history to generate optimized API execution scenarios.

User Query Handling Unit (16) communicates with users about user input queries, API execution results, and evaluation of execution results. The user query handling unit (16) also records API execution logs.

Scenario Self-Correcting Unit (17) monitors execution, detects anomalies, and updates scenarios dynamically.

Figure 1B:
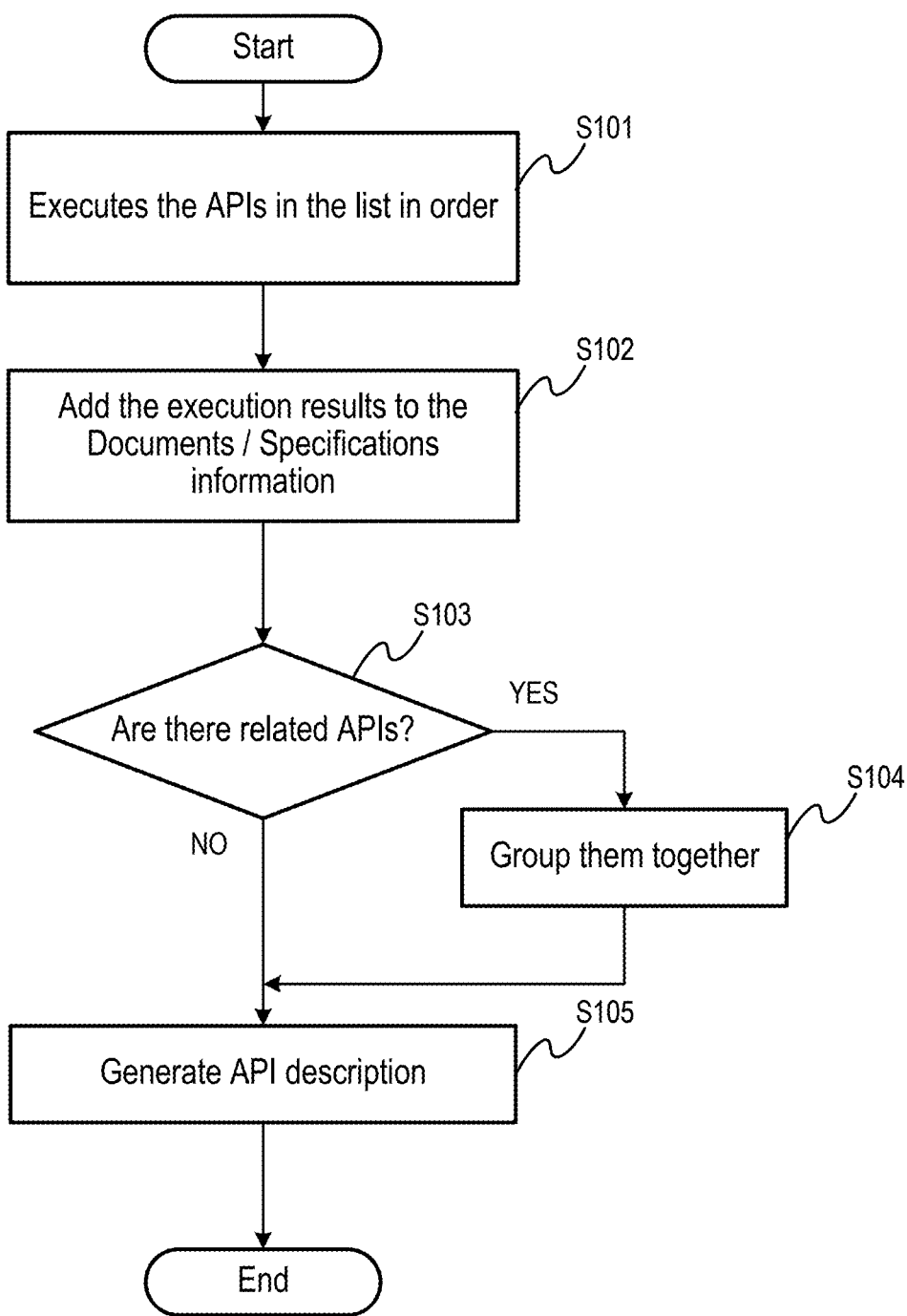
FIG. 1(b) illustrates an example flow of the training process, in accordance with an example implementation.

FIG. 1(b) illustrates an example flow for the training process, in accordance with an example implementation. The training process is executed independently of user queries, during which API descriptions are generated and relationships between APIs are established. In S101, the API description generation unit (13) executes queries on an API list derived from API documentation or API specifications (4). These queries are re-executed whenever an API is added or modified, ensuring that the data utilization platform (1) can continuously adapt to new or updated APIs.

In S102, the system processes the results of S101 by utilizing natural language processing (NLP) to compare the extracted data with information from API documentation or API specifications (4). This step extracts detailed information, including input examples, their corresponding meanings, output examples, and their corresponding meanings for each API. Then, this step generates API descriptions (131) based on this information.

In S103, the system searches for relevant APIs based on the results of test API execution. If related APIs are found (YES), then the process advances to S104 for further analysis.

In S104, the system continues analyzing the execution results of test API executions, focusing on grouping APIs based on data characteristics. Even if two datasets share the same key name, such as "id", they are categorized into separate groups if their values represent different entities (e.g., "T017-Rear-VLT-06" vs. "PART-0002"). Conversely, if different key names, such as "id" and "sensor_id", contain values in a similar format (e.g., "T017-Rear-VLT-06" vs. "T093-Front-VLT-23"), they are considered to represent the same type of event and are classified into the same group. The, the step adds the group information to the API description (131).

In S105, the API descriptions (131) generated in S102 and S104 are stored in the knowledge database (14).

Figure 1C:
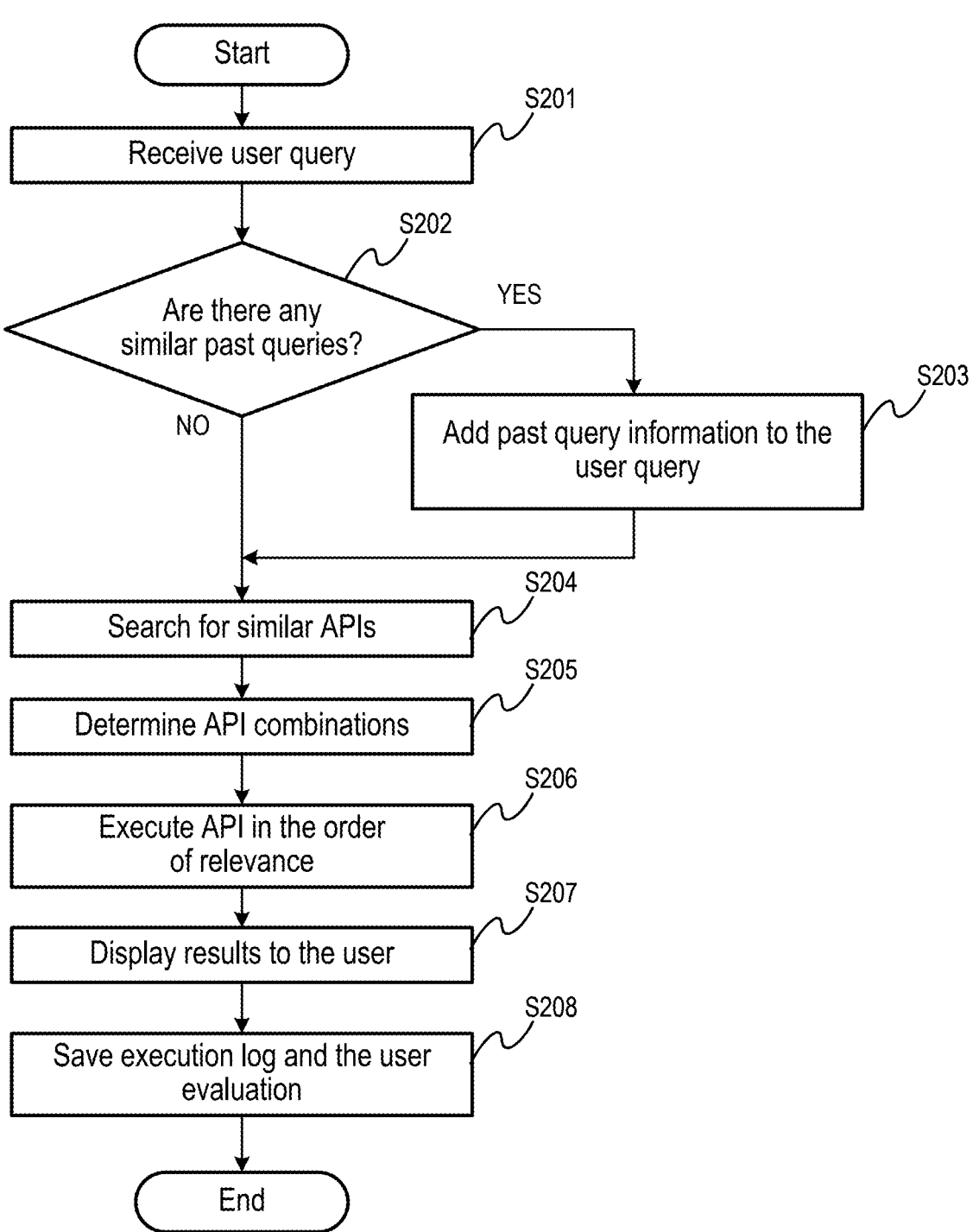
FIG. 1(c) illustrates an example flow to facilitate the API exploration, in accordance with an example implementation.

FIG. 1(c) illustrates an example flow to facilitate the API exploration, in accordance with an example implementation.

In S201, the user query handling unit (16) receives and records the user query through the user query input unit (161). The user query may be a natural language request, a list of desired information, or a combination of specific API names and parameters. The user query handling unit (16) retrieves details such as the user query itself, past execution results, execution logs, and success or failure information. The recorded data is maintained as a user query history (165), which is referenced in later steps to improve API execution.

In S202, the system determines whether there are past user queries related to the current query. This determination can be made using statistical methods or reinforcement learning models, although other approaches may also be used. If relevant past user queries exist (YES), then the process proceeds to S203.

In S203, the past user query history (165) information is added to the user query. The user query history includes data such as previous user queries, the list of APIs executed at that time, execution results, execution time, and user evaluations, among other factors.

In S204, the API execution scenario generation unit (15) searches for APIs relevant to the user query. This unit utilizes machine learning algorithms to analyze API descriptions created from the flow of FIG. 1(b) along with user queries recorded in S201 or S203. Through this analysis, the system identifies APIs that either match or are similar to the user's request. Multiple APIs may be identified as candidates at this stage.

At S205, the system selects the APIs to be executed. The first step in this selection process is extracting API group information. The API execution scenario generation unit (15) references the group information generated from the flow of FIG. 1(b) and adds APIs belonging to the same group as the ones identified in S204 to the list of candidates. Next, statistical methods or reinforcement learning models are applied to evaluate dependencies between APIs. Through this analysis, the API execution scenario generation unit (15) determines whether a combination of APIs needs to be executed to retrieve the necessary information and, if so, in what order they should be executed.

Figure 2:
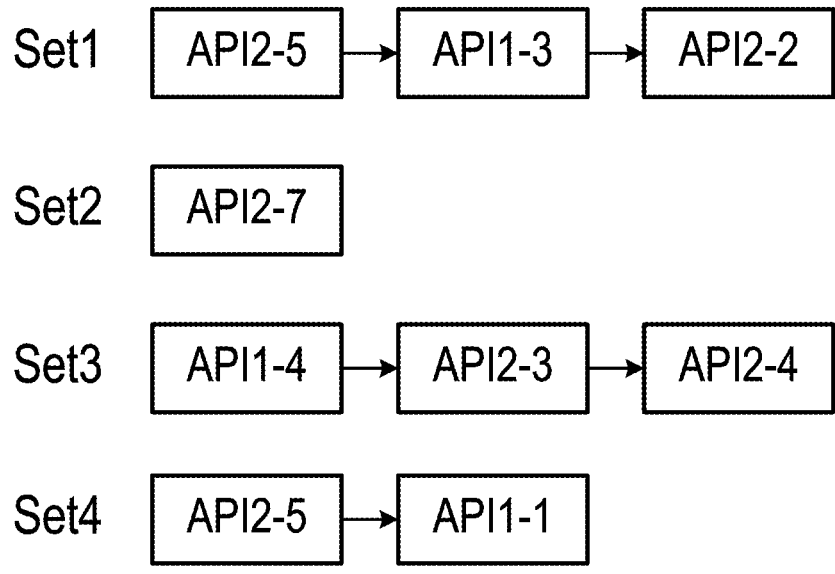
FIG. 2 is an example of a candidate API execution sequence generated by the API execution scenario generation unit, in accordance with an example implementation.

FIG. 2 presents an example of a candidate API execution sequence generated by the API execution scenario generation unit (15), in accordance with an example implementation. For instance, in Set 1 of FIG. 2, the system determines that the required data can be obtained by executing API2-5, API1-3, and API2-2 in that specific order.

Figure 3:
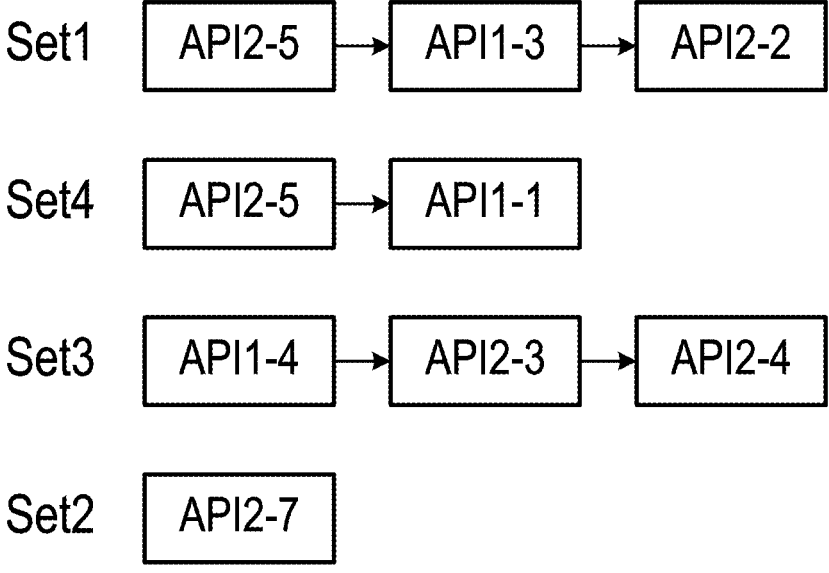
FIG. 3 illustrates an example rearrangement of sets of APIs to be executed in order of priority, in accordance with an example implementation.

Following this, the API execution scenario generation unit (15) references the past execution records from the user query history (165) stored in the knowledge database (14). By analyzing the success rates and execution times of previously executed similar APIs, the system determines which set of APIs should be executed and assigns execution priorities. For example, API sets with higher success rates and shorter execution times may be given higher priority. FIG. 3 illustrates an example rearrangement of sets of APIs to be executed in order of priority, in accordance with an example implementation. Specifically, FIG. 3 illustrates a rearrangement of FIG. 2 in order of priority.

In S206, the system executes the selected APIs. API calls are made following the execution priorities determined in S205. Throughout this process, the execution log unit (162) records execution logs including API responses, errors encountered, and overall execution performance.

At S207, the API execution result output unit (164) compiles and processes the API execution results. This involves structuring the retrieved data in a user-friendly format and summarizing execution details. The processed results are prepared for delivery to the user, ensuring that the user receives relevant and well-processed data.

Finally, in S208, the user provides feedback on the execution results through the user query evaluation unit (163). The API execution scenario generation unit (15) adds the API execution records to the user query history (165) and stores them in the knowledge database (14). This facilitates continuous learning and adaptation, improving future API selection and execution planning.

Figure 4:
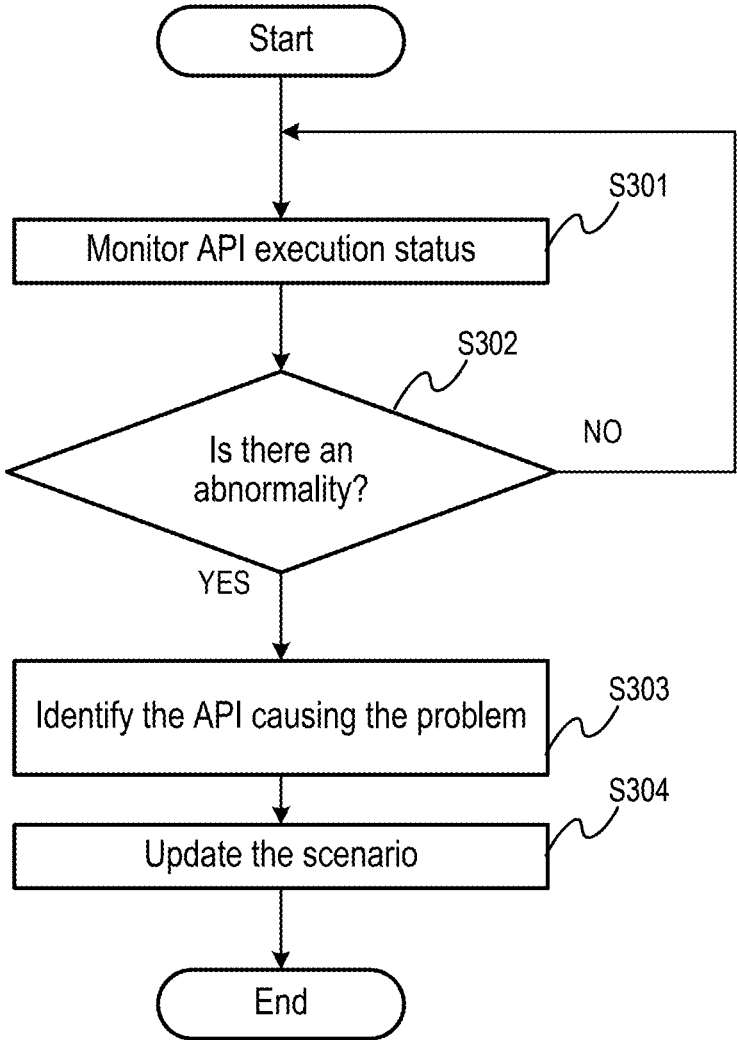
FIG. 4 illustrates an example flow for the self-correcting API execution, in accordance with an example implementation.

FIG. 4 illustrates an example flow for the self-correcting API execution, in accordance with an example implementation. In S301, the system monitors the API execution status. The scenario self-correction unit (17) continuously tracks response times, error rates, and success conditions for each API call, ensuring that the execution process is consistently observed.

In S302, the system determines whether an anomaly has occurred during API execution. If all APIs execute successfully (NO), then the system proceeds to normal result processing. However, if an anomaly such as API failure, timeout error, or unexpected response is detected (YES), then the process moves to S303.

In S303, the scenario self-correction unit (17) identifies the specific API responsible for the issue. It then instructs the API execution scenario generation unit (15) to generate a new API execution scenario (151) excluding the faulty API.

Figure 5:
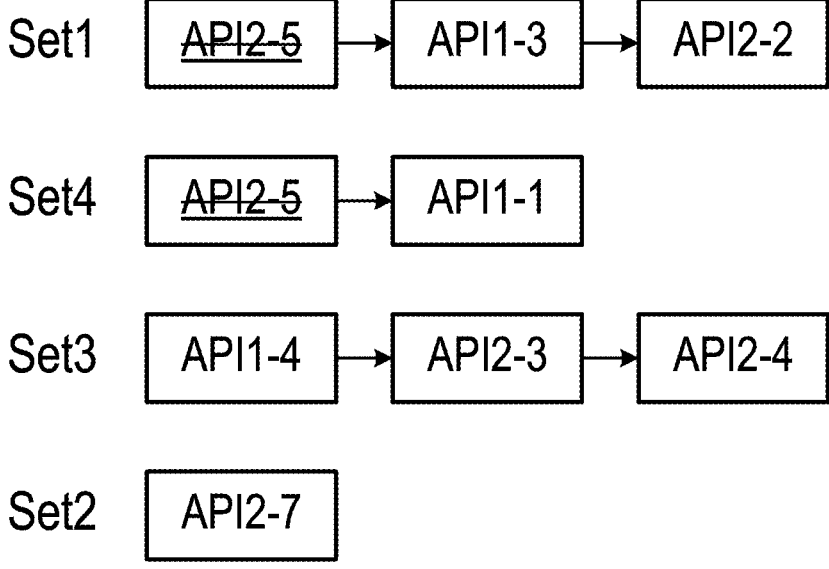
FIG. 5 is an example of API execution scenario reconstruction, in accordance with an example implementation.

FIG. 5 illustrates an example of API execution scenario reconstruction, in accordance with an example implementation. If API2-5 is identified as the cause of the issue, the API execution scenario generation unit (15) removes Set1 and Set4, which contain API2-5, from the execution scenario (151). As a result, Set3 becomes the highest-priority API execution scenario (151).

Finally, in S304, the system executes the newly generated API execution scenario (151). The updated scenario runs without the faulty API, allowing the system to maintain stability while completing the process. This ensures that the user receives the execution results without being affected by the detected anomaly. This adaptive correction mechanism enables continuous execution and system resilience, enhancing the reliability of API interactions.

Figure 6:
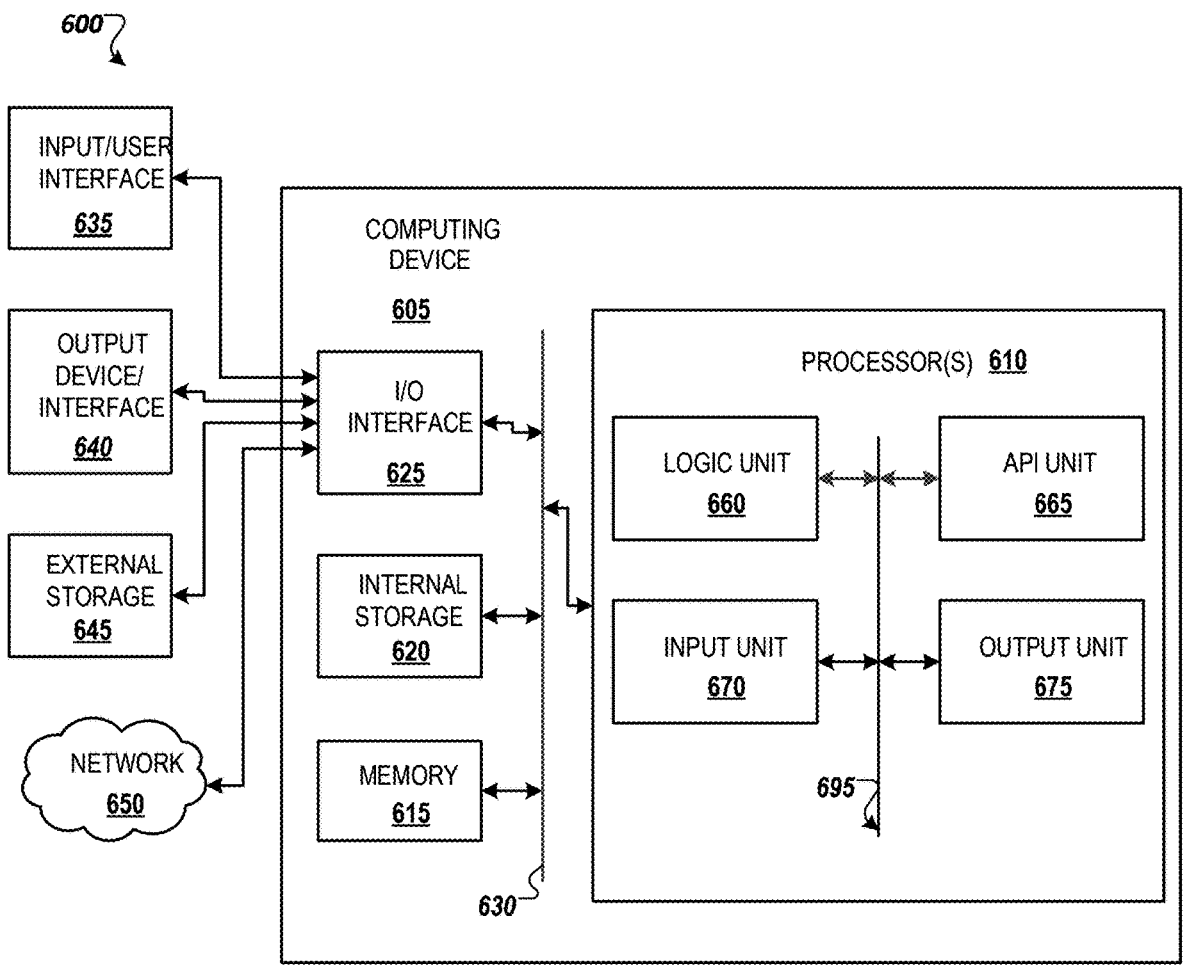
FIG. 6 illustrates an example computing environment with an example computer device suitable for use in some example implementations.

FIG. 6 illustrates an example computing environment with an example computer device suitable for use in some example implementations, such as the environment to facilitate the functionality of data utilization platform 1 as illustrated in FIG. 1 Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Processor(s) 610 can be configured to facilitate a system for application programming interface (API) management of information retrieval as illustrated in FIG. 1(*a*), can be configured execute a method or instructions to generate descriptions for each API on an API list, the generating the descriptions by executing queries on the API list based on API documentation or API specifications; executing natural language processing to extract input examples and corresponding meanings, and output examples and corresponding meanings for the each API in the API list; and generating the descriptions for the each API on the API list from the input examples and corresponding meanings and the output examples and corresponding meanings. As illustrated in FIG. 1(*b*) Processor(s) 610 can be configured to execute a method or instructions to generate an API execution scenario that defines ones of the APIs in the API list to execute, by providing the generated descriptions and user query history to a machine learning algorithm configured to extract similar APIs to the user query history to generate the API execution scenario comprising the extracted similar APIs; and execute the generated API execution scenario in response to user queries facilitated by user query handling as illustrated in FIG. 1(*c*).

Depending on the desired implementation, the generated descriptions and the generated API execution scenario can be dynamically updated in response to modifications or additions to the API list as illustrated in FIG. 4.

Processor(s) 610 can be configured to execute the method or instructions as described above, and can further be configured to generate the descriptions by comparing the input examples and the output examples of the each API in the API list to identify APIs in the API list having similar values to the input examples and the output examples; and grouping the identified APIs as related APIs as described with respect to FIG. 1(*b*) and FIGS. 2 to 3.

Processor(s) 610 can be configured to execute the method or instructions as described above, and be further configured to generate the API execution scenario by utilizing the grouped related APIs, executing reinforcement learning models trained on past execution patterns to determine dependencies between the grouped related APIs as described with respect to FIG. 1(*c*).

Processor(s) 610 can be configured to execute the method or instructions as described above, and be further configured to generate the API execution scenario by determining a combination of ones of the extracted similar APIs and execution order from the ones of the extracted similar APIs to generate the API execution scenario as described with respect to FIG. 1(*c*).

Processor(s) 610 can be configured to execute the method or instructions as described above, and be further configured to generate the API execution scenario by referencing the user query history for success rates and execution times to determine the combination of the ones of the extracted similar APIs as described with respect to FIG. 1(*c*).

Processor(s) 610 can be configured to execute the method or instructions as described above, and be further configured to execute a self-correction process involving, upon detecting an anomaly from monitoring API execution status, identifying APIs from the executed API execution scenario causing the anomaly; and generating another API execution scenario that omits the identified APIs causing the anomaly for the execution as described with respect to FIG. 4 and FIG. 5.

Processor(s) 610 can be configured to execute the method or instructions as described above, and be further configured to facilitate the user query handling, by recording user queries, query execution results, execution logs, and success/failure information as the user query history as described with respect to FIG. 1(*a*).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for application programming interface (API) management of information retrieval, comprising:
   generating descriptions for each API on an API list, the generating the descriptions comprising:
   executing queries on the API list based on API documentation or API specifications;
   executing natural language processing to extract input examples and corresponding meanings, and output examples and corresponding meanings for the each API in the API list; and
   generating the descriptions for the each API on the API list from the input examples and corresponding meanings and the output examples and corresponding meanings;
   generating an API execution scenario that defines ones of the APIs in the API list to execute, the generating the API execution scenario comprising providing the generated descriptions and user query history to a machine learning algorithm configured to extract similar APIs to the user query history to generate the API execution scenario comprising the extracted similar APIs; and
   executing the generated API execution scenario in response to user queries facilitated by user query handling.

2. The method of claim 1, wherein the generated descriptions and the generated API execution scenario are dynamically updated in response to modifications or additions to the API list.

3. The method of claim 1, wherein the generating the descriptions comprises:
   comparing the input examples and the output examples of the each API in the API list to identify APIs in the API list having similar values to the input examples and the output examples; and
   grouping the identified APIs as related APIs.

4. The method of claim 3, wherein the generating the API execution scenario comprises utilizing the grouped related APIs, executing reinforcement learning models trained on past execution patterns to determine dependencies between the grouped related APIs.

5. The method of claim 1, wherein the generating the API execution scenario comprises determining a combination of ones of the extracted similar APIs and execution order from the ones of the extracted similar APIs to generate the API execution scenario.

6. The method of claim 5, wherein the generating the API execution scenario comprises referencing the user query history for success rates and execution times to determine the combination of the ones of the extracted similar APIs.

7. The method of claim 1, further comprising executing a self-correction process comprising:
   upon detecting an anomaly from monitoring API execution status:
   identifying APIs from the executed API execution scenario causing the anomaly; and
   generating another API execution scenario that omits the identified APIs causing the anomaly for the execution.

8. The method of claim 1, further comprising facilitating the user query handling, the facilitating the user query handling comprising recording user queries, query execution results, execution logs, and success/failure information as the user query history.

9. A system for application programming interface (API) management of information retrieval, comprising:
   a processor, configured to:
   generate descriptions for each API on an API list, the generating the descriptions by:
   executing queries on the API list based on API documentation or API specifications;
   executing natural language processing to extract input examples and corresponding meanings, and output examples and corresponding meanings for the each API in the API list; and
   generating the descriptions for the each API on the API list from the input examples and corresponding meanings and the output examples and corresponding meanings;
   generate an API execution scenario that defines ones of the APIs in the API list to execute, by providing the generated descriptions and user query history to a machine learning algorithm configured to extract similar APIs to the user query history to generate the API execution scenario comprising the extracted similar APIs; and
   execute the generated API execution scenario in response to user queries facilitated by user query handling.

10. The system of claim 9, wherein the generated descriptions and the generated API execution scenario are dynamically updated in response to modifications or additions to the API list.

11. The system of claim 9, wherein the processor is configured to generate the descriptions by:
   comparing the input examples and the output examples of the each API in the API list to identify APIs in the API list having similar values to the input examples and the output examples; and
   grouping the identified APIs as related APIs.

12. The system of claim 11, wherein the processor is configured to generate the API execution scenario by utilizing the grouped related APIs, executing reinforcement learning models trained on past execution patterns to determine dependencies between the grouped related APIs.

13. The system of claim 9, wherein the processor is configured to generate the API execution scenario by determining a combination of ones of the extracted similar APIs and execution order from the ones of the extracted similar APIs to generate the API execution scenario.

14. The system of claim 13, wherein the processor is configured to generate the API execution scenario by referencing the user query history for success rates and execution times to determine the combination of the ones of the extracted similar APIs.

15. The system of claim 9, wherein the processor is further configured to execute a self-correction process comprising:

upon detecting an anomaly from monitoring API execution status:

identifying APIs from the executed API execution scenario causing the anomaly; and generating another API execution scenario that omits the identified APIs causing the anomaly for the execution.

16. The system of claim 9, wherein the processor is configured to facilitate the user query handling, by recording user queries, query execution results, execution logs, and success/failure information as the user query history.

\* \* \* \* \*